United States Patent [19]

Sakamoto et al.

[11] 4,231,686
[45] Nov. 4, 1980

[54] CONTROL SYSTEM OF APPARATUS FOR TRANSPORTING SLURRY

[75] Inventors: Masakatsu Sakamoto, Matsudo; Kenji Uchida, Kashiwa; Yukishige Kamino, Ibaraki, all of Japan

[73] Assignee: Hitachi, Ltd., Japan

[21] Appl. No.: 72,672

[22] Filed: Sep. 5, 1979

[30] Foreign Application Priority Data

Sep. 6, 1978 [JP] Japan .................................. 53-108633

[51] Int. Cl.³ ........................ B65G 53/30; B65G 53/66
[52] U.S. Cl. ........................................ 406/14; 406/30; 406/109
[58] Field of Search ........................ 406/12, 14, 19, 30, 406/109, 120

[56] References Cited

U.S. PATENT DOCUMENTS

| | | | |
|---|---|---|---|
| 2,916,441 | 12/1959 | Kruse, Jr. | 406/30 X |
| 3,163,329 | 12/1964 | Mornas | 406/30 X |
| 3,449,013 | 6/1969 | Sakamoto et al. | 406/109 |
| 3,938,912 | 2/1976 | Sakamoto et al. | 406/120 X |

*Primary Examiner*—Jeffrey V. Nase
*Attorney, Agent, or Firm*—Craig & Antonelli

[57] ABSTRACT

A control system for an apparatus for hydraulically transporting sedimentation prone slurry containing pulverized or powdered solid material mixed with water. A pipeline resistance of a slurry transport pipe at a proper location is detected by varying the flow rate of the slurry at the starting point of slurry transportation, and the critical flow velocity for slurry sedimentation is determined by using the pipeline resistance. The slurry is economically transported at the flow velocity above the critical flow velocity.

3 Claims, 6 Drawing Figures

CONTROL SYSTEM OF APPARATUS FOR TRANSPORTING SLURRY

The present invention relates to a control system for an appratus for hydraulically transporting slurry prone to sedimentation. Apparatus for hydrualic transportation of such sedimentation prone slurry are disclosed, for example, in U.S. Pat. Nos. 3,449,013 and 3,938,912. For transportation with these systems, solid material is pulverized and mixed with water to form a slurry. The slurry flowing through a pipeline has a flow velocity exhibiting a minimum of the pipeline resistance, i.e. a so-called critical velocity for sedimentation. Slurry transportation at a velocity below the critical velocity results in the solid granules settling thereby to possibly plugging up the pipeline. This critical flow velocity varies with such factors as the shape specific gravity of solid granules as well as the concentration of the solid granules in the slurry.

However, it is very difficult to keep such factors of solid or granular material consistent when it is hydraulically transported. Because these factors are allowed to vary within certain ranges when the solid granules are dispersed in water, it is impracticable to determine the critical flow velocity for each of combinations of them by previous testing. Especially at a mining site or the like, the variation of granular size depends upon a deposit being excavated so as to make such a determination impossible. Therefore, it is necessary to use a flow velocity much greater than the critical flow velocity for sedimentation derived from the estimated average dispersion of solid material. However, since the power required for hydraulic transportation is directly proportional to the cube of the flow velocity, and the attrition of transport pipe increases in proportion to the square or cube of the flow velocity the economic loss will be very large.

The object of the present invention is to prevent a sedimentation of slurry which would plug up the transport pipe and also to reduce the cost of power for transportation of the slurry.

To achieve the above object, according to the present invention, a control system is provided for an apparatus for hydraulically transporting sedimentation prone slurry through a pipeline system including at least one feed pipe into which the slurry and a driving liquid are alternately fed and a transport pipe connected to the feed pipe, through which the slurry is transported. The system includes a flow rate regulating valve provided at a predetermined portion on the pipeline system with a flow meter being provided in series with the flow rate regulating valve. A differential pressure gauge is provided at another predetermined portion on the pipeline system with a pipeline resistance calculating means for calculating a pipeline resistance on the basis of a differential pressure derived from said differentail pressure gauge. A valve controlling means is provided for controlling an opening degree of the flow rate regulating valve. A flow rate calculating means stores a flow rate-pipeline resistance characteristic at a given opening degree of the flow rate regulating valve, and calculates the flow rate at a critical flow velocity for slurry sedimentation on the basis of the flow rate-pipeline resistance characteristic. Safety factor multiplying means are provided for multiplying the flow rate at the critical flow velocity derived from the flow rate calculating means by a safety factor and memory controlling means store the flow rate values at the critical flow velocity derived form the safety factor multiplying means and deliner the maximum flow rate of those at the critical flow velocity for application to the valve controlling means whereby the sedimentation prone slurry is transported through the pipeline system at a flow velocity which is above the critical flow velocity for slurry sedimentation.

Other objects and advantageous features of the present invention will become more apparent from the following description in connection with the accompanying drawings in which.

Figure 3:
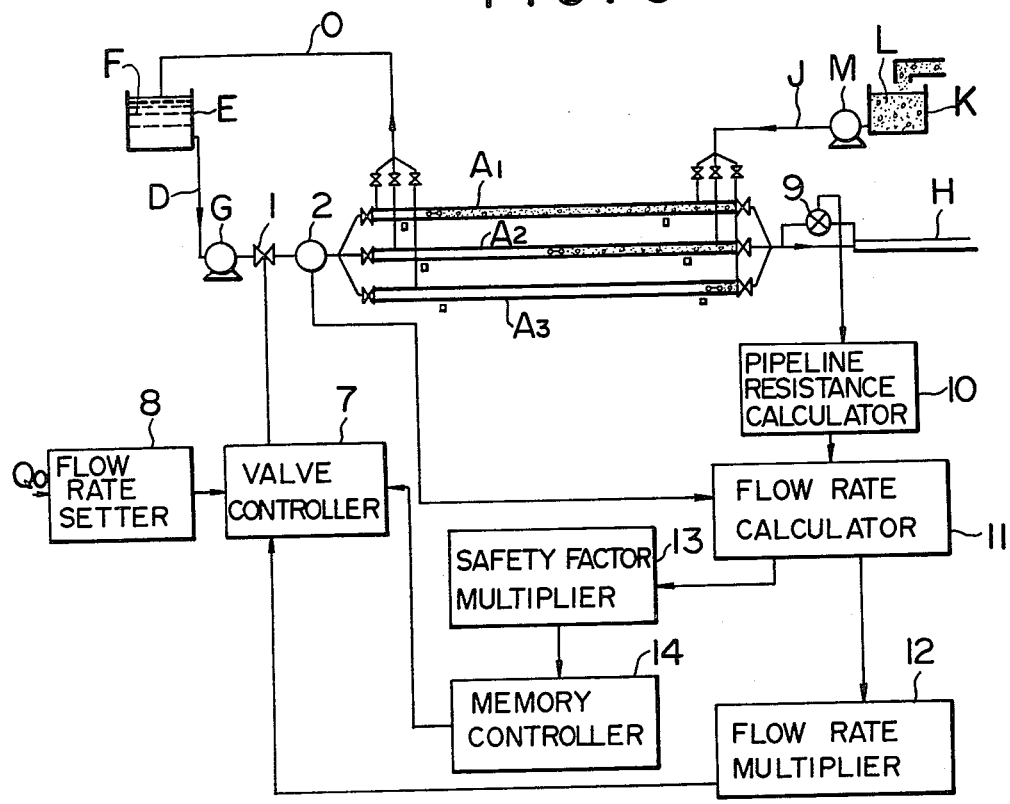
FIG. 3 is a diagram in accordance with the present invention for of a control system of an apparatus for hydraulically transporting sedimentation prone slurry.
Figure 4:
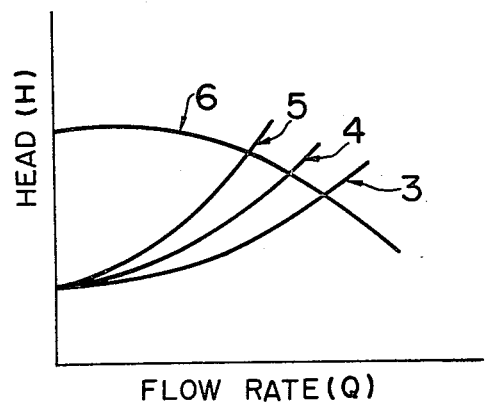
Figure 5:
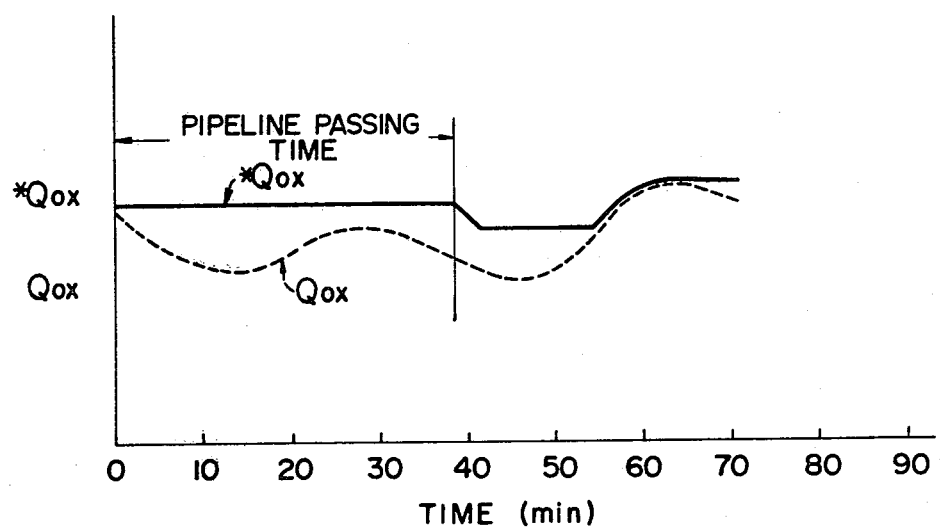
Figure 6:
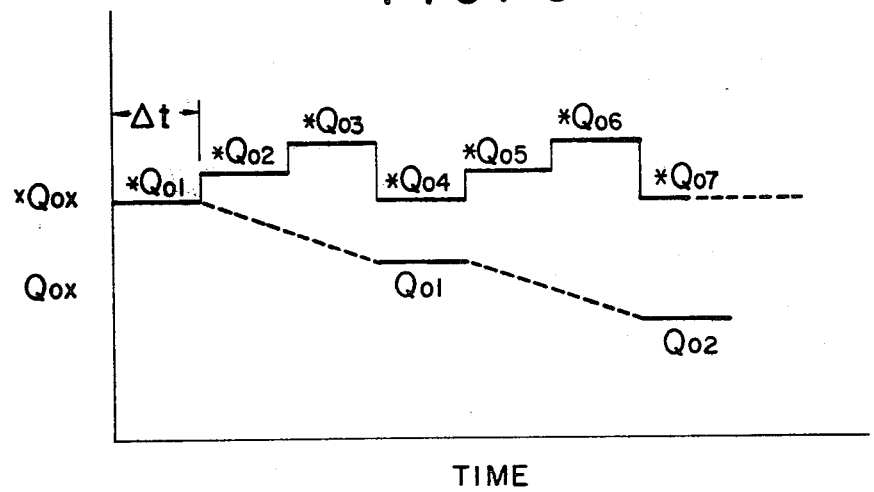

FIG. 4 ia a graph illustrating a flow rate-head characteristic of a pump for feeding a driving liquid in the system of FIG. 3;

FIG. 5 diagramatically illustrates variations of the flow rate at the critical flow velocity for slurry sedimentation and the controlled flow rate; and FIG. 6 illustrates a detail of the flow rate variation in FIG. 5.

Figure 1:
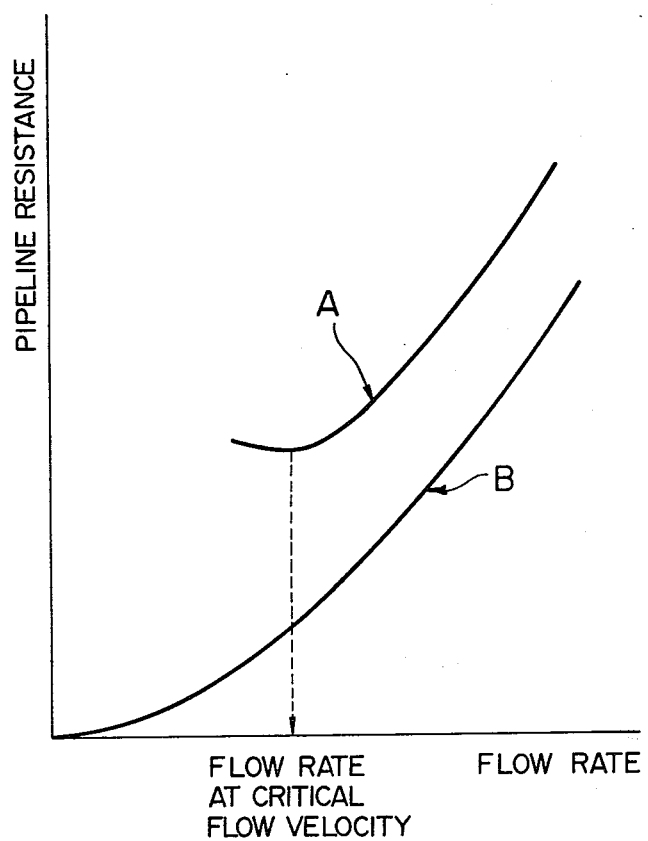
FIG. 1 is a graph illustrating a relationship between a flow rate within a pipe and a pipeline resistance.

An embodiment of the invention will be described in detail with reference to the accompanying drawings wherein like reference characters are used throughout the various views to designate like parts. In general, a pipeline resistance over any section of, for example, 10 meters to several tens of meters, of a pipeline can easily be determined by a differential pressure gauge. As shown in FIG. 1, it is empirically known that the characteristic behavior of slurry in a transport pipe approximates a quadratic curve designated A with the minimum flow rate (exhibiting critical flow velocity for sedimentation) when it is plotted with the pipeline resistance on the ordinate and the average flow velocity on the abscissa. Thus, if the flow velocity is measured in at least three points of the pipeline, the quadratic curve a can be obtained and thus the flow rate at the critical velocity can also be obtained. The present invention is based on this view point. In FIG. 1, the characteristic behavior of water is shown by curve designated B, for the sake of comparison.

Figure 2:
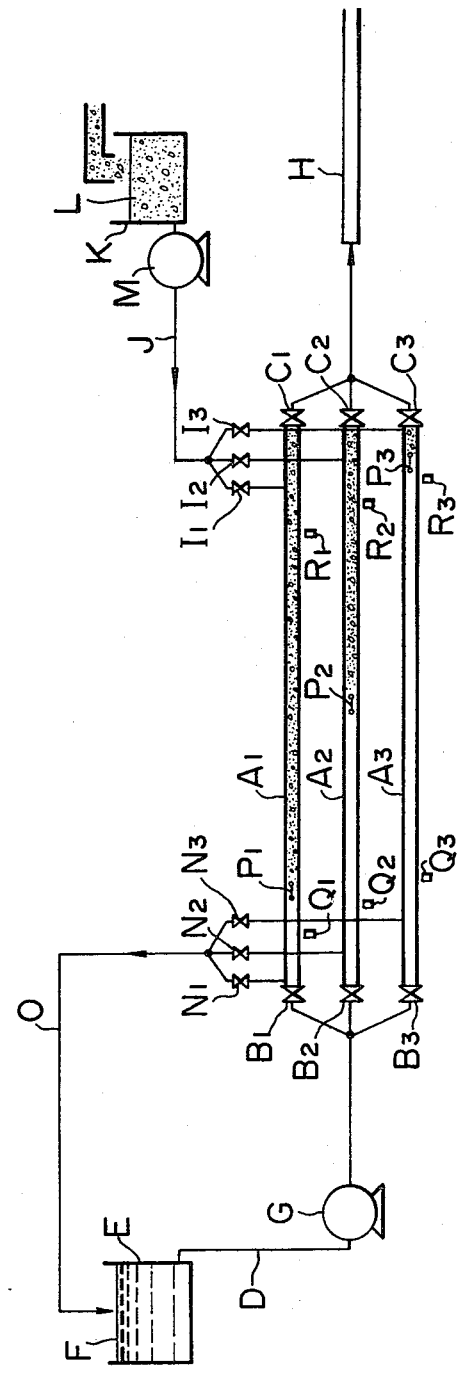
FIG. 2 is a diagram of a conventional slurry transport apparatus.

As shown in FIG. 2, a known slurry transport system includes a plurality of feed pipes designated $A_1$, $A_2$ and $A_3$, disposed in parallel each of which are respectively provided with driving liquid feed valves $B_1$, $B_2$ and $B_3$ at one end and slurry discharge valves $C_1$, $C_2$ and $C_3$ at the other end. The inlets of valves $B_1$, $B_2$ and $B_3$ are connected to a high-pressure pump G which pumps a driving liquid F, under pressure, from a driving liquid tank E through a pipe D to the respective feed pipes $A_1$, $A_2$, $A_3$. The outlets of valves $C_1$, $C_2$ and $C_3$ are connected with transport pipe H. Inlet valves $I_1$, $I_2$ and $I_3$ are connected near the inlets of valves $C_1$, $C_2$ and $C_3$, so that the respective feed pipes $A_1$, $A_2$, $A_3$ will receive slurry L from a slurry tank K through a pipe J when it is pumped by a slurry pump M. Valves $N_1$, $N_2$, $N_3$ are connected near the outlets of valves $B_1$, $B_2$ and $B_3$, so that the driving liquid F in the feed $A_1$, $A_2$, $A_3$ will be returned to the driving liquid tank E through a return pipe O. Detectors $Q_1$, $Q_2$, $Q_3$, $R_1$, $R_2$ and $R_3$ which respectively detect separators $P_1$, $P_2$ and $P_3$ a located near the boundary between driving liquid F and slurry L inside the feed pipes $A_1$, $A_2$, $A_3$ when the separations $P_1$, $P_2$, $P_3$ are displaced to either left or right limit positions. The respective detectors $Q_1$, $Q_2$, $Q_3$, $R_1$, $R_2$, $R_3$ are placed on the outside of the pipes in the neighborhood of their ends. Prior to sending slurry L out through transport pipe H, the valves $B_1$, $B_2$ and $B_3$ for feeding driving liquid F and the valves $C_1$, $C_2$ and $C_3$ for discharging slurry L are closed, and the valves $N_1$, $N_2$ and $N_3$ and the valves $I_1$, $I_2$ and $I_3$ are opened. The slurry L in the slurry tank K is pumped into the feed pipes $A_1$, $A_2$, $A_3$ by operation of the slurry pump M. As the slurry L is pumped into the feed pipes $A_1$, $A_2$, $A_3$, the driving liquid F therein is returned to driving liquid tank E through the return pipe O with the separators $P_1$, $P_2$, $P_3$ in the feed pipes $A_1$, $A_2$, $A_3$ being displaced to the left. When the separators $P_1$, $P_2$, $P_3$ reach the left side limit, the detectors $Q_1$, $Q_2$ $Q_3$ detect the position of the separators $P_1$, $P_2$, $P_3$ to stop the slurry pump M and close the valves $N_1$, $N_2$, $N_3$, $I_1$, $I_2$ and $I_3$, and the valves $B_1$, $B_2$ and $B_3$ for feeding driving liquid F and the valves $C_1$, $C_2$ and $C_3$ for discharging slurry L are opened and the high-pressure pump G is operated. Thus, the driving liquid F is pumped into each of feed pipes $A_1$, $A_2$, $A_3$ to force the slurry L into transport pipe H. As the slurry L moves out, the separators $P_1$, $P_2$, $P_3$ are carried to the right, and when they reach the right side limit, the detectors $R_1$, $R_2$ and $R_3$ send a signal to stop the high-pressure pump G and close the valves $B_1$, $B_2$ and $B_3$ for feeding the driving liquid L and the valves $C_1$, $C_2$ and $C_3$ for discharging the slurry L and at the same time open the valves $N_1$, $N_2$ and $N_3$, and $I_1$, $I_2$ and $I_3$ to restart the slurry pump M. Then, the above operation is repeated.

If the respective valves of each feed. Pipes $A_1$, $A_2$, $A_3$, are turned on and off under appropriate time cycles with respect to the other feed pipes, the sequence of events for each of the feed pipes $A_1$, $A_2$, $A_3$ is repeated in such a manner that the high-pressure pump G and the slurry pump M are allowed to operate continuously and the transport is made continuous.

A sedimentation-sedimentation prone slurry transporting control system according to the invention will now be described more fully hereinbelow in connection with FIGS. 3-6.

As shown in FIG. 3 the pipe D through which the driving liquid F is pumped by the high-pressure pump G is provided with a flow rate regulator such as a regulating valve 1 and flow rate detector such as a flow meter 2. The regulating valve 1 changes the flow rate of the slurry L discharged into the transport pipe H from inside of the feed pipes $A_1$, $A_2$ and $A_3$ with a change in the discharge flow rate being detected by the flow meter 2.

FIG. 4 shows variations of a pipeline resistance characteristic with respect to a degree of opening $\theta$ of the regulating valve 1, with curves designated 3, 4 5 representing the resistance characteristics depicted as the regulating valve 1 is progressively closed, and a Q/H curve when the rotational speed and the actual head of the high pressure pump G are constant. The curve 3 is plotted for the greatest opening of the regulating valve 1. Various relations between the degree of opening and the flow rate of the regulating valve 1 are known, which are, for example, a fixed rate characteristic with a fixed rate of a change of the flow rate to opening degree, a linear characteristic and a quadratic curve charactristic.

The degree of opening of the regulating valve 1 is controlled by a regulating valve controller 7 (FIG. 3). The degree of opening $\theta$ of the regulating valve is relative to the flow rate Q by the following equation $$Q = (a\theta + b) Q_{max} \quad (1)$$

where a and b are constants, and $Q_{max}$ is the flow rate when the regulating valve is fully opened. The valve controller 7 previously stores the relation of the equation (1).

For an input flow rate $Q_{01}$, the equation (1) is rewritten with $Q = Q_{01}$ into the following equation $$\theta = \left( \frac{Q_{01}}{Q_{max}} - b \right)/a \quad (2)$$

By using the equation (2), the regulating valve controller 7 calculates the degree of opening $\theta$ and controls the regulating valve 1 according to the calculated degree of opening $\theta$. The valve controller 7 is provided with a flow rate setter 8 and receives the set value $Q_{01}$.

A differential pressure guage 9 is provided at the inlet of the transport pipe H in order to detect a pressure drop over a proper section of the transport pipe H. The detected value is fed to a pipeline resistance calculator 10 where the pipeline resistance R is calculated over the section. The pipeline resistance calculator 10 previously stores a relation between a differential pressure $\Delta P$ and a pipeline resistance R. For practical purpose, the equation approximates to the following relation.

$$R = K_2 \Delta P + K_1 \quad (3)$$

where $K_1$ and $K_2$ are constants. The pipeline resistance R calculated, together with the flow rate Q from the flow meter 2, is applied to a flow rate calculator 11 for the critical flow velocity for sedimentation. The flow rate calculator 11 previously stores the R (pipeline resistance) - Q (flow rate) relation shown in FIG. 1 and given by the following equation $$R = C_n Q^n + C_{n-1} Q^{n-1} + \ldots C_o \quad (4)$$

where $C_i$ is coefficinet ($i = 0, 1, 2, \ldots, n$). For practical purposes, $n = 2$ is approximately satisfactory resulting in the following equation.

$$R = C_2 Q^2 + C_1 Q + C_o \quad (5)$$

In these equations, the coefficinet $C_i$ ($i = 0, 1, 2$) is determined by the following equations $$C_2 = \frac{R_{01}\alpha - R_{02}(1 + \alpha) + R_{03}}{(*Q_{01})^2 \alpha (1 - \alpha)^2 (1 + \alpha)} \quad (6)$$

$$C_1 = \frac{-R_{01}\alpha^2 + R_{02}(1 + \alpha^2) - R_{03}}{*Q_{01}\alpha(1 - \alpha)^2} \quad (7)$$

$$C_0 = \frac{R_{01}\alpha 3 - R_{02}\alpha(1 + \alpha) + R_{03}}{(1 - \alpha)^2 (1 + \alpha)} \quad (8)$$

where $\alpha$ is a multiplication factor described hereinbelow, and $R_{01}$, $R_{02}$ and $R_{03}$ are pipeline resistances also described hereinbelow. The flow rate $Q_{cr}$ minimizing the pipeline resistance R is expressed by the following equation $$Q_{cr} = \frac{C_1}{2C_2} \tag{9}$$

With respect to the flow rate change at the critical flow velocity, a pipeline resistance $R_{01}$ is calculated taking the given flow rate $Q_{01}$ input from exterior to the flow rate setter 8 as $*Q_{01}$, and then the following multiplications are successively performed by a flow rate multiplier 12. The above-mentioned $*Q_{01}$ (generally $*Q_{On}$ ($n=1, 4, \ldots n$)) represents the maximum of stored flow rate valves described hereinbelow. The given flow rate $*Q_{On}$ may be calculated by the following equation:

$$*Q_{02} = *Q_{01} \times \alpha \tag{10}$$

$$*Q_{03} = *Q_{02} \times \alpha \tag{11}$$

where $\alpha$ is a flow rate multiplication factor and approximates to 1, for example, 1.1. The calculated $*Q_{02}$ and $*Q_{03}$ are successively fed to the regulating valve controller 7 to control the regulating valve 1. Pipeline resistances $R_{02}$ and $R_{03}$, corresponding to the $*Q_{02}$ and $*Q_{03}$, and successively calculated by the pipeline resistance calculator 10 and the calculated resistances are fed to the flow rate calculator 11.

A flow rate $Q_{cro}$, at the critical flow velocity, calculated by using the flow rates $*Q_{01}$, $*Q_{02}$, and $*Q_{03}$ and the pipeline resistances $R_{01}$, $R_{02}$, and $R_{03}$, is applied to a safety factor multiplier 13 where it is multiplied by a safety factor Y as below in accordance with the following equation:

$$Q_{04} = Q_{cro} \times Y \tag{12}$$

This multiplication is for eliminating a detection error and/or a calculation error, and the factor Y usually ranges 1.02 to 1.05. The flow rate $Q_{04}$ calculated here is fed to a memory controller 14 where it is stored therein, and is compared with the flow rate $*Q_{01}$. When the flow rate $Q_{04}$ is smaller than the flow rate $*Q_{01}$, the $Q_{01}$ is determined as $*Q_{04}$ (i.e. $*Q_{04} = Q_{01}$), while when the $Q_{04}$ is larger than the $*Q_{01}$, and $Q_{04}$ is determined as $*Q_{04}$ (i.e. $*Q_{04} = Q_{04}$). Then, the $*Q_{04}$ is applied to the regulating valve controller 7. Then, the opening degree corresponding to the $*Q_{04}$ is calculated by using the equation (2). The regulating valve 1 is then set to the calculated degree of opening. Further, the pipeline resistance $R_{04}$ corresponding to the $*Q_{04}$ is calculated and the flow rate multiplier 12 multiplies the $*Q_{04}$ by the flow rate multiplication factor $\alpha$ according to the equations (10) and (11) resulting in the following equation:

$$*Q_{05} = *Q_{01} \times \alpha \tag{13}$$

This $*Q_{05}$ is applied to the regulating valve controller 7 to change the degree of opening $\theta$ of the flow rate regulating valve 1, and then a pipeline resistance $R_{05}$ corresponding to the $*Q_{05}$ is calculated. Further, the $*Q_{05}$ is multiplied by the factor $\alpha$, and then a valve $*Q_{06}$ is obtained by the following equation:

$$*Q_{06} = *Q_{05} \times \alpha \tag{14}$$

The $*Q_{06}$ is applied to the regulating valve controller 7 to change the degree of opening $\theta$ of the regulating valve 1, and the pipeline resistance $R_{06}$ corresponding to the $*Q_{06}$ is obtained. By using those valves $*Q_{04}$, $*Q_{05}$, $*Q_{06}$, $R_{04}$, $R_{05}$, and $R_{06}$, the flow rate calculator 11 for the critical velocity for slurry sedimentation calculates a flow rate $Q_{crl}$ which, in turn, is applied to a safety factor multiplier 13 to obtain $Q_{07}$. The $Q_{07}$ is then stored in the memory controller 14 where it is compared with the $*Q_{01}$ and $*Q_{04}$ which are already stored. Then, the maximum flow rate among them is applied to the regulating valve controller 7 thereby to set the degree of opening $\theta$ of the regulating valve 1. The above-mentioned operation is repeated at proper intervals or continuously. Through the repititive operations, the flow rate $Q_{0x}$ ($x = 1, 4, 7, \ldots n$) at the critical flow velocity is sequentially obtained and the thus obtained $Q_{0x}$ is stored in the memory controller 14. The memory controller 14 produces the maximum flow rate $*Q_{0x}$ of the flow rates stored therein for application to the regulating valve controller 7.

The flow rate $Q_{0x}$ stored in the memory controller 14 is erased when the corresponding part of the slurry L subjected to the flow rate detection is discharged from the transport pipe H. In other words, the condition for the slurry L to pass through the transport pipe H is expressed by the following equation:

$$SL = \sum_{x=0}^{n} (1 + \alpha + \alpha^2) *Q_{0x} \cdot \Delta t < l \cdot S \tag{15}$$

where l and S designate the length and cross-area of the transport pipe H, and SL is an amount of slurry L within the transport pipe H. The equation (15) is based on the assumption that a detection period of time $\Delta t$ of each flow rate is constant as shown in FIG. 6 and the differential pressure gauge 9 is provided immediately following the transport pipe H.

When the amount of slurry SL is greater than l·S, the first $Q_{ox}$ stored as shown in FIG. 5 is erased in the memory location of the memory controller 14.

In FIG. 5, a broken line indicates a variation of the flow rate $Q_{ox}$ at the critical flow velocity to be stored and a continuous line indicates the maximum value of those stored and hence a variation of the flow rate $*Q_{ox}$ used for control operation. Therefore, when a part of the slurry L subjected to the flow rate detection is discharged from the transport pipe H, the stored content $Q_{ox}$ corresponding to such part is erased.

With this, $*Q_{ox}$ also changes, if the erased $Q_{ox}$ was the maximum of those stored. In the FIGURE, it is shown that, as the first $Q_{ox}$ is erased, the maximum value of the $Q_{ox}$ stored reduces and, therefore, $*Q_{ox}$ indicated by the continuous line also reduces until the next maximum $Q_{ox}$. Consequently, the slurry L is transported with the flow rate approximate to and higher than the flow rate at the critical flow velocity. Means for changing the discharge flow rate of slurry L is not limited to the flow rate regulating valve 1. The discharge flow rate may be changed by, for example, controlling the rotational speed of the high pressure pump G.

As described above, the beneficial effects attained by the invention are to prevent the transport pipe H from being plugged up due to accummulation of solid granules therein thereby to improve safety, and to secure the economical flow velocity of slurry L thereby avoiding a waste of power and realizing a saving of energy. No prior strict setting of the shape, the specific gravity, and the concentration of solid granules is necessary, so that the related equipments are simplified, thus resulting in lowering of the cost of the equipment cost.

What is claimed is:

1. A control system of an apparatus for hydraulically transporting slurry prone to sedimentation through a pipeline system including at least one feed pipe into which a slurry and a driving liquid are alternately fed, and a transport pipe, connected to the feed pipe, through which the slurry is transported, the control system comprising:
- a flow rate regulating valve means provided at a predetermined portion of the pipeline system;
- a flow meter means provided in series with said flow rate regulating valve for metering a flow through the pipeline system and providing an output signal of the metered flow;
- a differential pressure gauge means provided at another predetermined portion on the pipeline system for detecting a pressure drop and for providing an output signal of a detected pressure drop;
- pipeline resistance calculating means for calculating a pipeline resistance in response to an output signal from said differential pressure gauge means;
- a flow rate calculating means for storing a flow rate pipeline resistance characteristic at a given degree of opening of said flow rate regulating valve means, and for calculating the flow rate at a critical flow velocity for slurry sedimentation on the basis of the flow rate-pipeline resistance characteristic in response to output signals received from the flow meter means and the pipeline resistance calculating means and for providing an output signal of the calculated flow rate;
- safety factor multiplying means for multiplying the flow rate at the critical flow velocity in response to an output signal from said flow rate calculating means by a safety factor and for providing an output signal;
- memory controlling means for storing flow rate values at the critical flow velocity in response to an output signal from said safety factor multiplying means and for providing an output signal of a maximum flow rate of those flow rate values at the critical flow velocity; and
- a valve controlling means for controlling a degree of opening of said flow regulating valve in response to an output signal from said memory controlling means;
- whereby the slurry is transported through the pipeline system at a flow velocity above the critical flow velocity for slurry sedimentation.

2. A system according to claim 1, wherein said flow rate regulating valve is provided at an outlet of a high-pressure pump for pumping the driving liquid into the feed pipe, and said differential pressure gauge is provided at an inlet area of the transport pipe.

3. A system according to claim 2, wherein one end of said differential pressure gauge is placed at an inlet opening of the transport pipe.

* * * * *